United States Patent
White

[11] 3,922,507
[45] Nov. 25, 1975

[54] DISTRIBUTING TERMINAL ASSEMBLY TEST APPARATUS

[76] Inventor: Arthur N. White, 13920 Ash Way, Alderwood Manor, Wash. 98036

[22] Filed: Mar. 4, 1974

[21] Appl. No.: 447,715

[52] U.S. Cl. ............... 179/175.3 R; 179/175
[51] Int. Cl.² ............................... H04B 3/46
[58] Field of Search ...... 179/175, 175.1 A, 175.3 R; 324/51, 53

[56] References Cited
UNITED STATES PATENTS

| | | | |
|---|---|---|---|
| 3,559,200 | 1/1971 | Walters | 324/51 |
| 3,579,100 | 5/1971 | Lauver | 324/53 |
| 3,627,932 | 12/1971 | Garrett et al. | 179/175 |
| 3,711,661 | 1/1973 | Garrett et al. | 179/175.1 R |

Primary Examiner—Douglas W. Olms
Attorney, Agent, or Firm—John W. Kraft; Charles L. Kraft, II

[57] ABSTRACT

The DTA polarity tester comprises a housing, and a circuit including three probes corresponding to tip, ring and sleeve of a trunk terminal, and a pair of light emitting indicators connected with the first probe connected to one leg of the first indicator, the third probe connected to one leg of the second indicator, and the second probe connected in common to the remaining legs of each indicator. The tester includes a data plate by which the signal combinations from the light emitting indicators may be analyzed to locate the defective component and to narrow the cause of malfunction.

4 Claims, 3 Drawing Figures

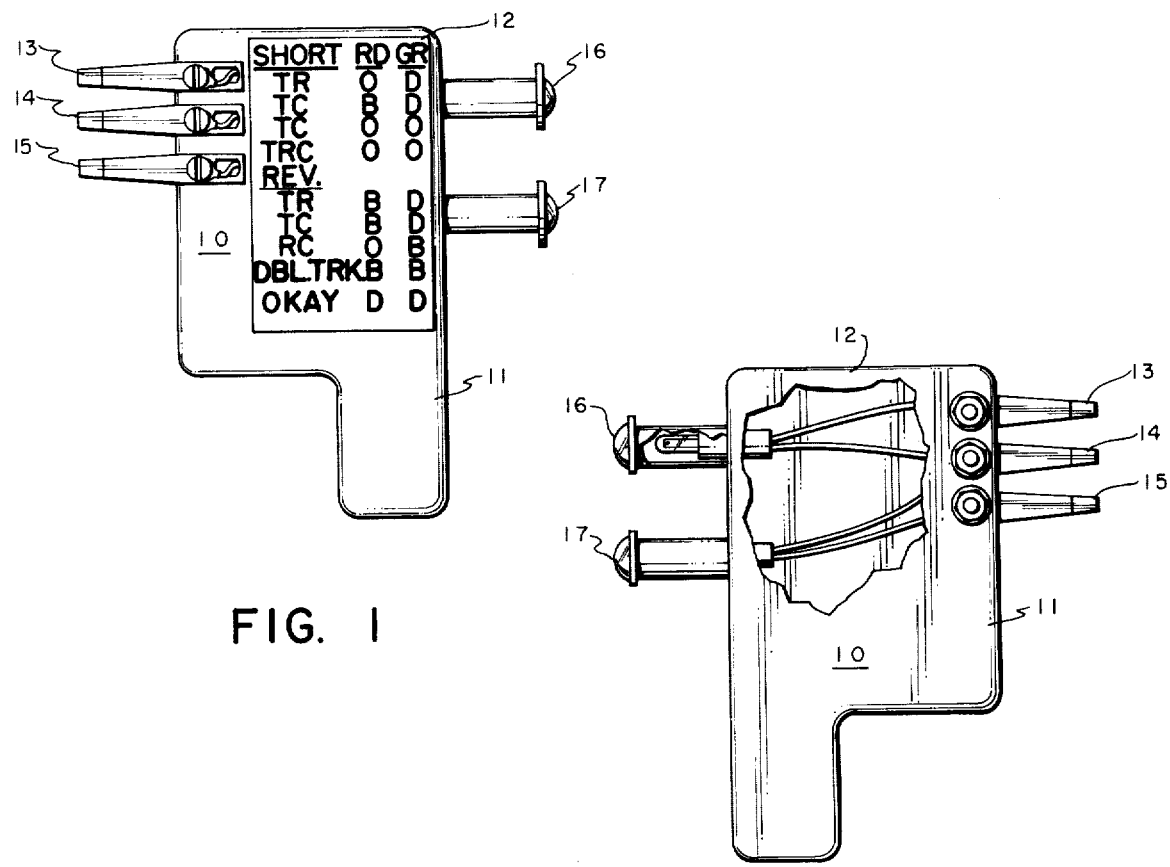
FIG. 1
FIG. 2
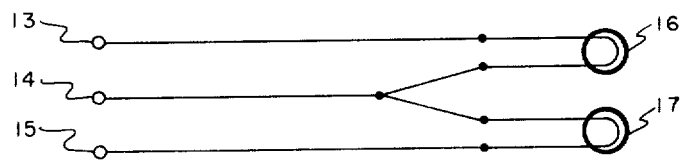
FIG. 3

DISTRIBUTING TERMINAL ASSEMBLY TEST APPARATUS

FIELD OF THE INVENTION

The present invention relates to telephoning, and more particularly to a DTA tester for telephone trunk connections.

BACKGROUND OF THE INVENTION

DTA testers refer to apparatus for quick testing of step-by-step inner-switch wiring for crosses, reversals, busies, false busies, and openings at the DTA or at the shelf terminal strip. DTA testers of the prior art typically include a base unit which provides the logic analysis circuit and the housing carrying the main assemblies of the tester, and a test probe assembly having contacts, plugs or clips, which are connectable with the terminals of a trunk. The two-part construction of the tester tends to provide an overly complex, cumbersome and expensive apparatus. It is a further problem that DTA testers have provided a highly analytical circuit testing apparatus which is more than ordinary two-prong circuit testers, but which actually may provide more information or complicated information than is demanded in cursory testing.

Accordingly, it is an object of the present invention to provide a tester for telephone DTA contacts, wrapped or soldered terminals. It is a corollary object of this invention to provide a compact, single package DTA testing apparatus of simple construction and circuitry.

It is another primary object of the present invention that the aforesaid distributing terminal assembly (hereinafter called DTA) tester be primarily directed to polarities, shorts, reversals, and to trunks that malfunction.

These and other objects shall become apparent from the description following, it being understood that modifications may be made without affecting the teachings of the invention here set out.

SUMMARY OF THE INVENTION

The DTA polarity tester comprises a housing, and a circuit including three probes corresponding to tip, ring and sleeve of a trunk terminal, and a pair of light emitting indicators connected with the first probe connected to one leg of the first indicator, the third probe connected to one leg of the second indicator, and the second probe connected in common to the remaining legs of each indicator. The tester includes a data plate by which the signal combinations from the light emitting indicators may be analyzed to locate the defective component and to narrow the cause of malfunction.

A more thorough and comprehensive understanding may be had from the detailed description of the preferred embodiment when read in connection with the drawings forming a part of this specification.

BRIEF DESCRIPTION OF THE DRAWINGS

FIG. 1 is a side elevational view of the DTA polarity tester of this invention.

FIG. 2 is a side elevational view taken from the side opposite the FIG. 1 with a portion of the exterior broken away for illustrative purposes.

FIG. 3 is a schematic diagram of the cirucit of the present DTA tester.

DETAILED DESCRIPTION OF THE PREFERRED EMBODIMENT

Referring now to the drawings and more particularly to the FIG. 1, the DTA polarity tester of this invention is shown to advantage and generally identified by the numeral 10. The tester 10 is carried in a suitable housing 11 designed for its purpose. The housing 11 may be fabricated of an insulated material, such as a high-impact polymer. It has been found that a pistol-type design is particularly convenient to handle in the area of the terminal trunk. Analytical indicia, such as a data plate 12, which shall be described hereinafter, may be affixed to one side of the housing 11.

Referring to the FIGS. 2 and 3, the circuit providing the tester 10 comprises three probes 13, 14 and 15, and a pair of light emitting indicators 16 and 17. The probes 13, 14 and 15 correspond to the ring, tip and sleeve terminals typically provided on the terminal trunk. Accordingly, the probes 13, 14 and 15 should be mounted on the housing 11 for convenient connection of the tester with the terminals of a terminal trunk. The probes 13, 14 and 15 should be selected for the particular application for which the tester 10 is to be used. Satisfactory probes may include alligator clips as shown in FIGS. 1 and 2, plugs or jacks. It may be of advantage to juxtaposition the probes 13, 14 and 15 such that the tester 10 may be inserted directly on a terminal cross-point group.

The light emitting indicators 16 and 17 provide indication of the connections in the trunk or at a trunk station, or the like, and a load between the signals from the probes 13, 14 and 15. It is to be understood that the indicators 16 and 17 may be incandescent lamps, as shown in the drawings. It has been found that the indicators 16 and 17 under present telephone trunk voltages should have an approximate load of 4.8 volts D. C. The indicators 16 and 17, associated with the pair of groups of probes 13 and 14, and 14 and 15, may be indicated by their juxtaposition on the housing 11, or by color of the respective indicators 16 and 17, or both. Different colors, such as red and green, may be used for the indicators 16 and 17 respectively.

As shown more clearly in the FIG. 3, the first probe 13 is connected to one side of the first indicator 16. The third probe 15 may be connected to one leg of the second indicator 17. The second probe 14 is connected in common to the remaining legs of the indicators 16 and 17.

Referring to the FIGS. 1 and 3, and more particularly to the data plate 12 shown in FIG. 1, the probes 13, 14 and 15 being connected to DTA terminals on the trunk or the like, operate as follows:

| Condition | Red (16) | Green (17) |
|---|---|---|
| Short Circuit Conditions | | |
| tip ring | off | dim |
| tip cross | bright | dim |
| tip cross | off | off |
| tip ring cross | off | off |
| Reversed Conditions | | |
| tip ring | bright | dim |
| tip cross | bright | dim |
| ring cross | off | bright |
| Double Trunk | bright | bright |
| Operative | dim | dim |

It may be seen that several of the combinations of signals from the indicators 16 and 17 have the same signal for differing malfunctions. However, it is also clear that these malfunctions having the same signal combinations are malfunctions to the same unit. Thus, the tester 10 is operable, by a very simple apparatuus, to locate the defective component, and to narrow the possible cause of the malfunction. The latter is provided by the tester in combination with the data plate 11.

Having thus described in detail a preferred apparatus which embodies the concepts and principles of the invention and which accomplishes the various objects, purposes and aims thereof, it is to be appreciated and will be apparent to those skilled in the art that many physical changes could be made in the apparatus without altering the inventive concepts and principles embodied therein. Hence, it is intended that the scope of the invention be limited only to the extent indicated in the appended claims.

I claim:

1. A method of testing telephone trunks and the like comprising the steps of connecting distribution terminal assemblies and the like from said telephone trunk to terminals of a distribution terminal assembly tester comprising a housing,, and a circuit including three probes corresponding to tip, ring and sleeve of said trunk terminal, and a pair of light emitting indicators connected with the first probe connected to one contact of the first indicator, the second probe connected to one contact of the second indicator, and the third probe connected in common to the contacts of each of said indicators opposite said contacts connected to said first and second probes respectively.

2. The method of claim 1 wherein said light emitting indicators have in a load of 4.8 volts.

3. The apparatus of claim 1 wherein said light emitting indicators are incandescent lamps.

4. The method of claim 1 wherein said DTA polarity tester is carried in a pistol-grip type housing wherein probes issue from the nose of said housing, and wherein said probes are juxtapositioned for conventient direct connection to said trunk terminals.

* * * * *